United States Patent
Rieβ

(10) Patent No.: US 8,355,400 B2
(45) Date of Patent: Jan. 15, 2013

(54) SYSTEM AND METHOD FOR TRANSMITTING INFORMATION OVER A PLURALITY OF COMMUNICATION LINKS

(75) Inventor: Mathias Rieβ, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 757 days.

(21) Appl. No.: 10/987,133

(22) Filed: Nov. 12, 2004

(65) Prior Publication Data

US 2006/0029103 A1    Feb. 9, 2006

Related U.S. Application Data

(60) Provisional application No. 60/599,538, filed on Aug. 6, 2004.

(51) Int. Cl.
*H04L 12/28* (2006.01)

(52) U.S. Cl. .......................................... 370/391

(58) Field of Classification Search .................. None
See application file for complete search history.

(56) References Cited

U.S. PATENT DOCUMENTS

| | | | | |
|---|---|---|---|---|
| 6,049,528 A * | 4/2000 | Hendel et al. | 370/235 |
| 6,222,858 B1 * | 4/2001 | Counterman | 370/474 |
| 7,006,500 B1 * | 2/2006 | Pedersen et al. | 370/394 |
| 7,154,911 B2 * | 12/2006 | Counterman | 370/484 |
| 7,158,523 B2 * | 1/2007 | Jacobson et al. | 370/395.1 |
| 7,239,611 B2 * | 7/2007 | Khisti et al. | 370/230 |
| 7,310,310 B1 * | 12/2007 | Shenoi et al. | 370/235 |
| 7,453,881 B2 * | 11/2008 | Tzannes et al. | 370/395.1 |
| 7,586,943 B2 * | 9/2009 | Pappalardo et al. | 370/466 |
| 2003/0099261 A1 * | 5/2003 | Jacobsen et al. | 370/542 |
| 2003/0128706 A1 * | 7/2003 | Mark et al. | 370/395.1 |
| 2004/0057388 A1 * | 3/2004 | Kolbe et al. | 370/252 |
| 2004/0062198 A1 * | 4/2004 | Pedersen et al. | 370/229 |
| 2004/0228278 A1 * | 11/2004 | Bruckman et al. | 370/231 |
| 2007/0050495 A1 * | 3/2007 | Sridhar et al. | 709/223 |

* cited by examiner

*Primary Examiner* — Nittaya Juntima
*Assistant Examiner* — Rhonda Murphy
(74) *Attorney, Agent, or Firm* — Slater & Matsil, L.L.P.

(57) ABSTRACT

A system and method for transmitting information over a plurality of communication links. In one embodiment, the invention includes a method for transmitting information over a plurality of physical communication links. The method includes bonding the plurality of physical communication links to generate a logical link comprising the plurality of physical communication links. Control means are provided for controlling the logical link. The information is transmitted over the plurality of physical communication links belonging to the logical link under the control of the control means.

27 Claims, 1 Drawing Sheet

SYSTEM AND METHOD FOR TRANSMITTING INFORMATION OVER A PLURALITY OF COMMUNICATION LINKS

CROSS-REFERENCE TO RELATED APPLICATIONS

This patent application claims priority to U.S. Provisional Patent Application Ser. No. 60/599,538, filed on Aug. 6, 2004 and incorporated herein by reference.

FIELD OF THE INVENTION

The present invention relates to a method for transmitting information over a plurality of physical communication links, in particular over a plurality of xDSL links ("digital subscriber line") having different data rates, the different communication links being bonded or combined to a common logical link, which is also called a "group".

BACKGROUND

The T1E1.4 standard for xDSL communication systems, hereby incorporated by reference, currently standardizes IMA+ ("inverse multiplexer for ATM"). IMA+ describes a method to bond various xDSL links having different data rates to only one logical link. This logical link is also called "group". The draft of the aforementioned standard already contains regulations with respect to the startup of the several links. However, the draft of this standard does presently not define the possibility as to how to configure the several xDSL links forming a group as one logical instance and how to control the behavior of the group (including configuration, startup, maintenance, management, etc.).

SUMMARY

Embodiments of the invention provide a system and method for transmitting information over a plurality of communication links. In one embodiment, the invention includes a method for transmitting information over a plurality of physical communication links. The method includes bonding the plurality of physical communication links to generate a logical link comprising the plurality of physical communication links. Control means are provided for controlling the logical link. The information is transmitted over the plurality of physical communication links belonging to the logical link under the control of the control means.

BRIEF DESCRIPTION OF THE DRAWINGS

The accompanying drawing is included to provide a further understanding of the present invention and is incorporated in and constitute a part of this specification. The drawing illustrates the embodiments of the present invention and together with the description serve to explain the principles of the invention. Other embodiments of the present invention and many of the intended advantages of the present invention will be readily appreciated, as they become better understood by reference to the following detailed description. The elements of the drawing are not necessarily to scale relative to each other. Like reference numerals designate corresponding similar parts.

DETAILED DESCRIPTION

Figure 1:
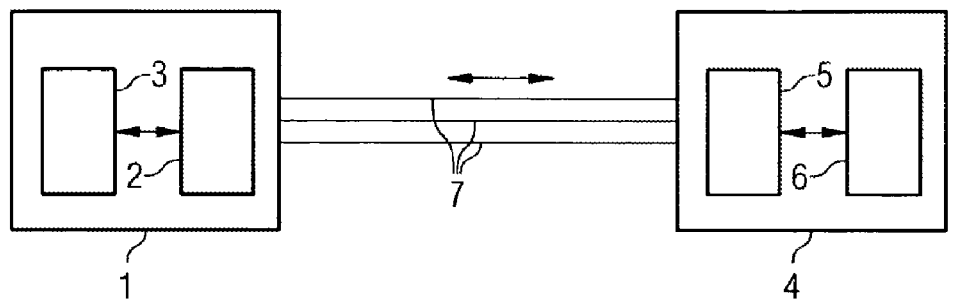
FIG. 1 illustrates one embodiment of a block diagram of a xDSL communication system of the present invention according to the IMA+ standard.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides a method for transmitting information over a plurality of physical communication links, which are combined or bonded to one logical link, in which the method provides the possibility for the controlling, and in particular for the configuration, of the logical link. Furthermore, the invention provides a respective communication device and a respective communication system.

In one embodiment, a method for transmitting information over a plurality of physical communication links is provided, the communication links being combined to one logical link in order to transmit the information over the physical communication links belonging to the logical link, and in which the method comprises the step of providing control means for controlling the logical link. Furthermore, a respective communication device, in particular for xDSL communication, and a respective communication system comprising at least two such communication devices are provided by the invention.

According to one embodiment of the invention, a new group instance is provided in the form of the aforementioned control means which, from a layer point of view, is superior to the physical layer of the several physical communication links. The physical communication links are preferably xDSL links having different data rates.

This new group instance allows the configuration, the startup, the maintenance and the management of the group, i.e. of the logical link. In other words, this new group instance controls the behavior of the respective group, including its configuration, startup, maintenance and management.

The new group instance is preferably provided in the form of a group state machine running on both sides of the respective connection. This means that the group state machine may be implemented on the side of a xDSL central office (CO) as well as on the side of the respective xDSL consumer premise equipment (CPE). The current status of the respective group state machine can be sent over the communication link in protocol-specific cells so that the bonding entity of both sides is aware of the status of its own group state machine as well as the status of the remote group state machine. Consequently, it is possible to control and configure the group, i.e. the logical link, from both sides of the connection. However, in general it will be preferred to control and configure the group from the central office side.

The group state machine comprises pre-defined states and transitions from one state to another state. Based on this group state machine the startup of the respective group is monitored and controlled. The group state machine also controls whether payload traffic can be sent over the physical links of the group or not, the adjustment or allocation of the required bandwidth being possible independently from the number of links of the respective group. This, in particular, can be controlled on the basis of configured parameters of the group on the one hand and on the basis of the status and the bandwidth of the respective physical links on the other hand.

In general, the group state machine allows to avoid misconfigurations of the respective group and, consequently, a deadlock of the whole system.

FIG. 1 illustrates on xDSL communication system in which the transmission of information is performed according to the IMA+ standard. The communication system comprises a first communication device 1 and second communication device 4, the information being transmitted between both communication devices 1 and 4 over a plurality of physical xDSL communication links 7. Communication device 1, for example, is located on the central office side of the respective xDSL communication system, while communication device 4, for example, may be located on the side of a consumer premise equipment.

According to the IMA+ standard, which is hereby incorporated by reference, the several physical xDSL links are combined or bonded to one common logical link, which is also called a "group". For this purpose, both communication devices 1, 4 comprise a bonding entity. This allows use of the several physical xDSL links 7 to carry a single payload stream, preferably an ATM ("asynchronous transfer mode") payload stream. By the bonding of the multiple xDSL links 7 it is possible to deliver ATM payload beyond the rate/reach capability of a single xDSL link.

In general, a bonding group is defined as a bi-directional data stream, preferably a ATM stream transported by multiple bearers across multiple physical media in both upstream and downstream directions. The upstream and downstream data rates may be different. A single bonding group usually cannot span multiple customer premises equipment (CPE) entities or central office (CO) side access nodes. As a consequence, the control channel is also a bi-directional ATM stream, consisting of ATM messages called "autonomous status messages" (ASM). The content and sequence of these messages defines a control protocol between the two bonding entities in both directions. The control protocol communicates the status of each link in the respective bonding group. The underlying bit rate or data rate of the individual links within a bonded group may be freely and independently changed by their respective physical layers.

According to FIG. 1, the bonding entity of both communication devices 1 and 4 comprises control means 3 and 6, respectively, which in turn comprise preferably a group state machine in order to control and configure the respective group, i.e. in order to control the configuration, startup, maintenance and management of the respective group. Furthermore, both communication devices 1 and 4 comprise transceiver entities 2 and 5, respectively, for transmitting and receiving information over the several xDSL links 7. The transceiver entities 2 and 5 communicate with the respective group state machines 3 and 6, respectively.

The group state machines 3 and 6 are preferably provided on both sides of the xDSL connection and are identical for both communication devices 1, 4. The current status of the respective group state machine is transmitted to the respective other communication device of the xDSL connection in fields of protocol-specific cells which inform the respective other communication device on the status of the respective other group state machine. Consequently, it is possible to configure and control the group assigned to the physical xDSL communication links 7 both from the communication device 1 and from the communication device 4.

Figure 2:
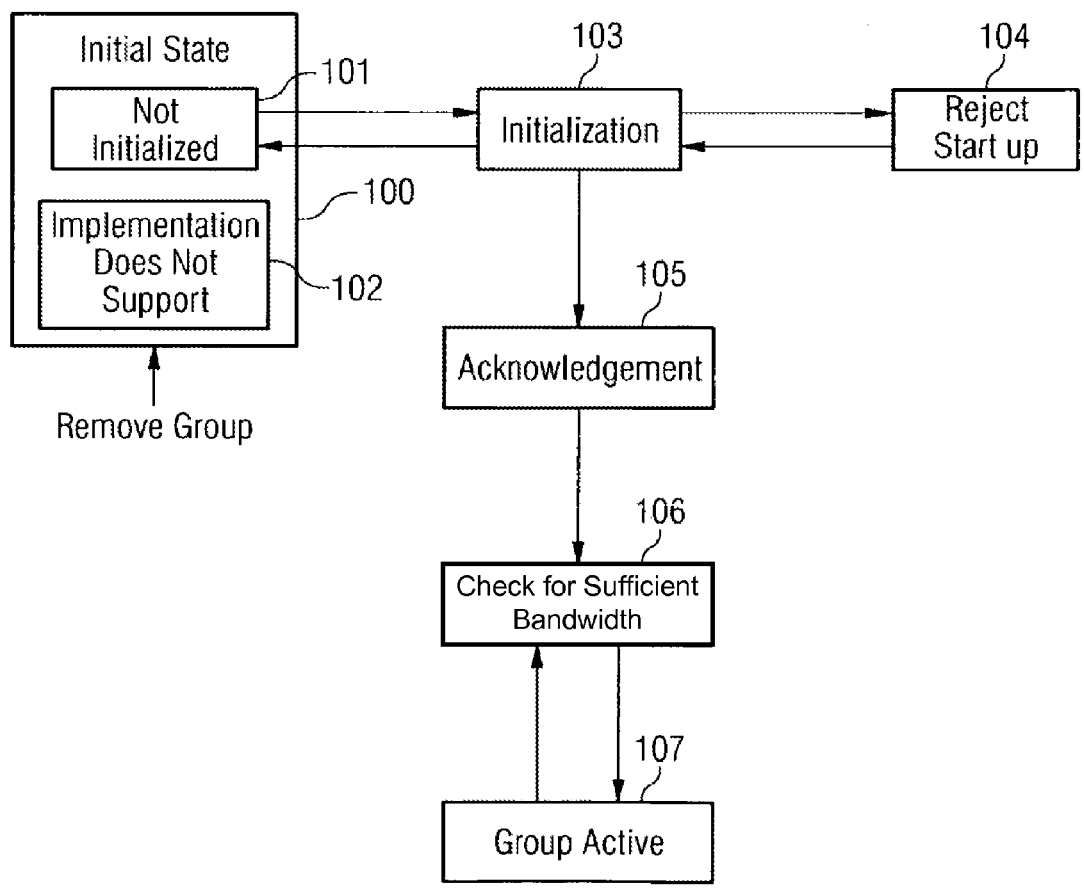
FIG. 2 illustrates a possible implementation of a group state machine according to one preferred embodiment of the present invention, which may be used in a communication device shown in FIG. 1.

FIG. 2 illustrates a possible implementation of a group state machine illustrated in FIG. 1 according to one embodiment of the invention.

Block 100 designates the initial state of the group state machine. This state is assumed if there is no request for an initialization of a group or if there is a request to remove a group having been already initialized again (sub state 101), or if the implementation of the respective communication device is not sufficient for the initialization of a group or does not support such an initialization (sub state 102).

Starting from state 100, the group state machine reaches state 103 if there is a request for initialization of a group, i.e. a logical link, and if the implementation and the resources available support such a group initialization. Such a request is also transmitted to the respective other communication device together with the required communication parameters ("parameter mapping") and a respective sequence index (SID). If the respective other communication device rejects these parameters or the sequence index, or if no message, preferably in the form of a so-called "autonomous status message" (ASM), is received ("ASM timeout"), the group state machine assumes state 104, and the startup of the group initialization is rejected. A return to state 103 is only possible if the respective other communication device proposes new parameters for the group initialization so that the group state machine can start with the initialization of the respective group.

On the other hand, if the respective other communication device (far end communication device) accepts the parameters received during state 103, the group state machine assumes state 105 which corresponds to an acknowledgement of the initialization of the respective group.

Thereafter, the group state machine checks whether the bandwidth available on the respective physical communication link 7 is sufficient for the transmission of information (state 106), and if the bandwidth is sufficient, the group state machine changes to state 107 in which the initialization of the respective group has been finished and the group is active. A transmission of information, i.e. payload data, is only possible in state 107.

In case the group state machine is in state 107 and the bandwidth available is no longer sufficient, the group state machine reassumes state 106 again and stops the transmission of payload data.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for transmitting information over a plurality of physical communication links comprising:
    bonding the plurality of physical communication links to generate a logical link comprising the plurality of physical communication links;
    assigning each of the physical communication links with a corresponding assigned data rate;

controlling the logical link using a first state machine on a first side of the communication links, controlling comprising transitioning from a first state to a second state upon receipt of a logical link initialization request, transmitting communication parameters to a device on a second side of the physical communication links while in the second state, transitioning from the second state to a third state upon if the device on the second side of the physical communications links accepts the transmitted communication parameters, transitioning from the third state to a fourth state, determining whether there is sufficient bandwidth on the first side of the communication links to transmit the information while in the fourth state, and receiving status information from the second side of the communication links indicating whether there is sufficient bandwidth on the second side of the communication links to transmit the information, transitioning from the fourth state to a fifth state if there is sufficient bandwidth on the first side of the communication links based on the determining and if there is sufficient bandwidth on the second side of the communication links based on the received status information; and transmitting the information over the plurality of physical communication links belonging to the logical link under the control of the controller if the first state machine is in the fifth state.

2. The method of claim 1, comprising defining the physical communication links as xDSL links.

3. The method of claim 1, wherein the assigned data rates are different for at least two of the physical communication links.

4. The method of claim 1, further comprising controlling and configuring the bonded plurality of physical communication links from the second side of the communication links based on a transmitted status of the state machine.

5. The method of claim 1, further comprising transmitting a status of the first state machine to a second state machine on the second side of the communication links.

6. The method of claim 5, wherein the first state machine is substantially identical to the second state machine.

7. A method for transmitting information over a plurality of physical communication links comprising:

bonding the plurality of physical communication links to generate a logical link comprising the plurality of physical communication links;

controlling the logical link using a first state machine on a first side of the communication links, controlling comprising transitioning from a first state to a second state upon receipt of a logical link initialization request, transmitting communication parameters to a device on a second side of the physical communication links while in the second state, transitioning from the second state to a third state upon if the device on the second side of the physical communications links accepts the transmitted communication parameters, transitioning from the third state to a fourth state, determining whether there is sufficient bandwidth on the first side of the communication links to transmit the information while in the fourth state, and receiving status information from the second side of the communication links indicating whether there is sufficient bandwidth on the second side of the communication links to transmit the information, transitioning from the fourth state to a fifth state if there is sufficient bandwidth on the first side of the communication links based on the determining and if there is sufficient bandwidth on the second side of the communication links based on the received status information; and transmitting the information over the physical communication links belonging to the logical link under the control of the controller if the first state machine is in the fifth state.

8. The method of claim 7, comprising transmitting a status of the first state machine in protocol-specific cells to the other side of the physical communication links.

9. The method of claim 7, further comprising the step of monitoring an initialization of the logical link and controlling when payload data can be transmitted over the physical communication links belonging to the logical link by using the first state machine.

10. The method of claim 7, further comprising checking, by using the first state machine, parameters received from the second side of the physical communication links before initializing the logical link.

11. The method of claim 7, further comprising using the first state machine to control transmission of payload data over the physical communication links depending on a bandwidth available on the physical communication links.

12. The method of claim 11, further comprising using the first state machine to allow the transmission of payload data only if the bandwidth available on the physical communication links exceeds a predetermined threshold value.

13. The method of claim 7, further comprising using the first state machine to adjust a bandwidth for the transmission of the information over the physical communication links belonging to the logical link.

14. The method according to claim 7, further comprising allocating bandwidth on the plurality of physical communication links.

15. A communication device for transmitting information over a plurality of physical communication links, comprising:

a bonding device configured to bond the physical communication links to generate a logical link comprising the plurality of physical communication links;

an assignment device configured to assign each of the physical communication links with a corresponding assigned data rate;

a controller configured to control the logical link, wherein the controller comprises a first group state machine in a device on a first side of the physical communication links configured to be synchronized with a second group state machine on a second side of the physical communication links, wherein the first group state machine is configured to transition from a first state to a second state upon receipt of a logical link initialization request, wherein the communication device is configured to transmit communication parameters to a device on the second side of the physical communication links while in the second state, transition from the second state to a third state if the device on the second side of the physical communications links accepts the transmitted communication parameters, transition from the third state to a fourth state, wherein the communication device is configured to determine whether there is sufficient bandwidth on the first side of the communication links to transmit the information while in the fourth state, and receive status information from the second side of the communication links indicating whether there is sufficient bandwidth on the second side of the communication links to transmit the information, transition from the fourth state to a fifth state if there is sufficient bandwidth on the first side of the communication links based on the determining and if there is sufficient bandwidth on the second side of the communication links based on the received status information; and a transmitter configured to transmit the information over the plurality of physical communication links belonging to the logical link under the control of the controller during the fifth state.

16. The communication device of claim 15, wherein the assigned data rates are different for at least two of the physical communication links.

17. The communication device of claim 15, wherein the first group state machine is substantially identical to the second group state machine.

18. A communication system for transmitting information over a plurality of physical communication links between a first communication device and a second communication device, the first communication device and the second communication device comprising:

a bonding device configured to bond the physical communication links to generate a logical link comprising the plurality of physical communication links;

a controller configured to control the logical link, the controller comprising a first group state machine on a first side of the physical communication links configured to be synchronized with a second group state machine on a second side of the physical communication links, wherein the first group state machine is configured to transition from a first state to a second state upon receipt of a logical link initialization request, wherein the first communication device is configured to transmit communication parameters to the second communication device on the second side of the physical communication links while in the second state, transition from the second state to a third state if the second communication device on the second side of the physical communications links accepts the transmitted communication parameters, transition from the third state to a fourth state, wherein the first communication device is configured to determine whether there is sufficient bandwidth on the first side of the communication links to transmit the information while in the fourth state, and receive status information from the second side of the communication links indicating whether there is sufficient bandwidth on the second side of the communication links to transmit the information, transition from the fourth state to a fifth state if there is sufficient bandwidth on the first side of the communication links based on the determining and if there is sufficient bandwidth on the second side of the communication links based on the received status information; and a transmitter configured to transmit information over the plurality of physical communication links belonging to the logical link under the control of the controller during the fifth state.

19. The system of claim 18, wherein the first state machine is configured for transmission of payload data over the physical communication links depending on a bandwidth available on the physical communication links.

20. The system of claim 18, wherein the controller in the first communication device transmits a status of the first state machine in the first communication device to the second communication device.

21. The system of claim 18, wherein
the second state comprises an initialization state;
the third state comprises an acknowledgement state corresponding to an acknowledgement of the initialization of the logical link;
the fourth state comprises a state checking whether a first bandwidth available on the physical communication links is sufficient for transmission of information; and
the fifth state comprises a state indicating that the logical link is active.

22. The communication system of claim 18, wherein the first group state machine is substantially identical to the second group state machine.

23. A method for transmitting information over a plurality of physical communication links comprising:

bonding the plurality of physical communication links to generate a logical link comprising the plurality of physical communication links;

assigning each of the physical communication links with a corresponding assigned data rate;

controlling the logical link using a first state machine on a first side of the communication links, controlling comprising transitioning from a first state to a second state upon receipt of a logical link initialization request, transmitting communication parameters to a device on a second side of the physical communication links while in the second state, transitioning from the second state to a third state upon if the device on the second side of the physical communications links accepts the transmitted communication parameters, determining whether there is sufficient bandwidth on the first side of the communication links to transmit the information while in the third state, and receiving status information from the second side of the communication links indicating whether there is sufficient bandwidth on the second side of the communication links to transmit the information, transitioning from the third state to a fourth state if there is sufficient bandwidth on the first side of the communication links based on the determining and if there is sufficient bandwidth on the second side of the communication links based on the received status information; and transmitting the information over the plurality of physical communication links belonging to the logical link under the control of the controller if the first state machine is in the fourth state.

24. The method of claim 23, wherein transitioning from the third state to the fourth state comprises:

transitioning from the third state to an acknowledgement state; and transitioning from the acknowledgement state to the fourth state.

25. The method of claim 23, further comprising transmitting a status of the first state machine to a second state machine on the second side of the communication links.

26. The method of claim 25, wherein the first state machine is substantially identical to the second state machine.

27. The method of claim 23, further comprising defining the physical communication links as xDSL links.

* * * * *